Oct. 30, 1945.  A. Y. DODGE  2,387,722
METHOD OF MAKING VANED ELEMENTS
Filed March 25, 1942   2 Sheets-Sheet 1
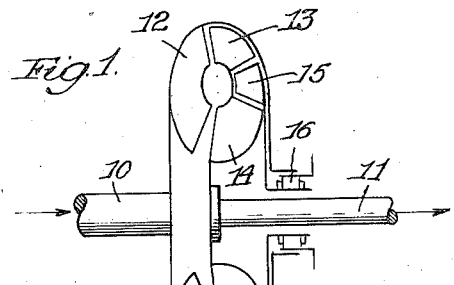
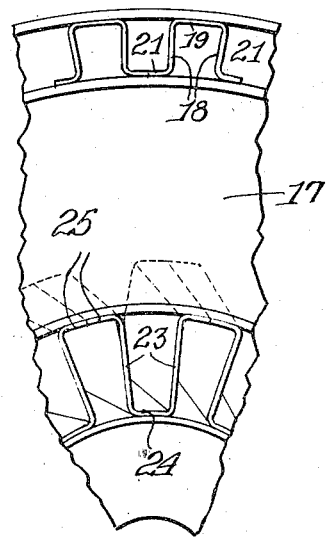
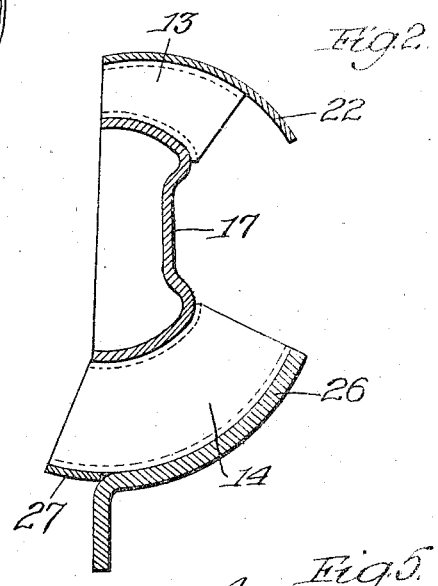
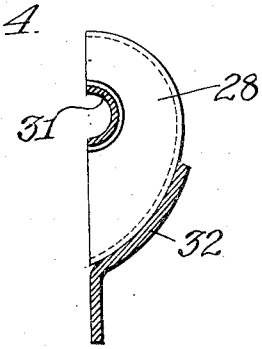
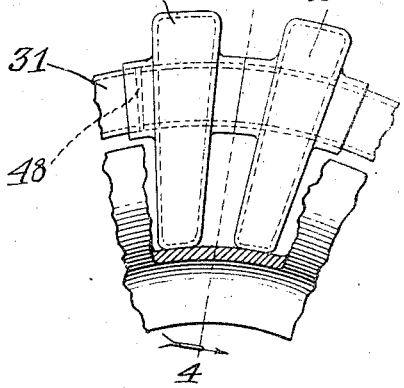
Inventor:
Adiel Y. Dodge,
By Dawson, Coms & Booth,
Att'ys Oct. 30, 1945.  A. Y. DODGE  2,387,722
METHOD OF MAKING VANED ELEMENTS
Filed March 25, 1942  2 Sheets-Sheet 2
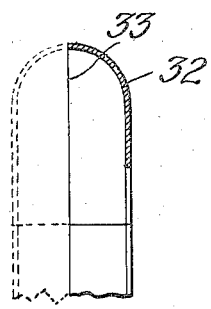
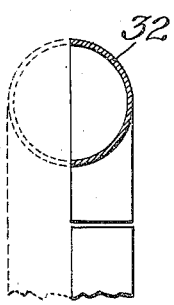
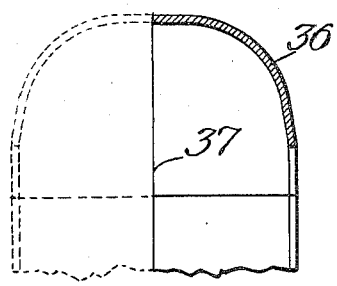
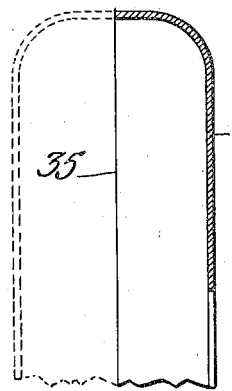
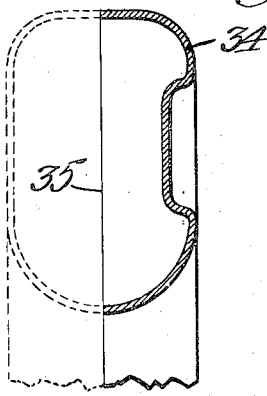
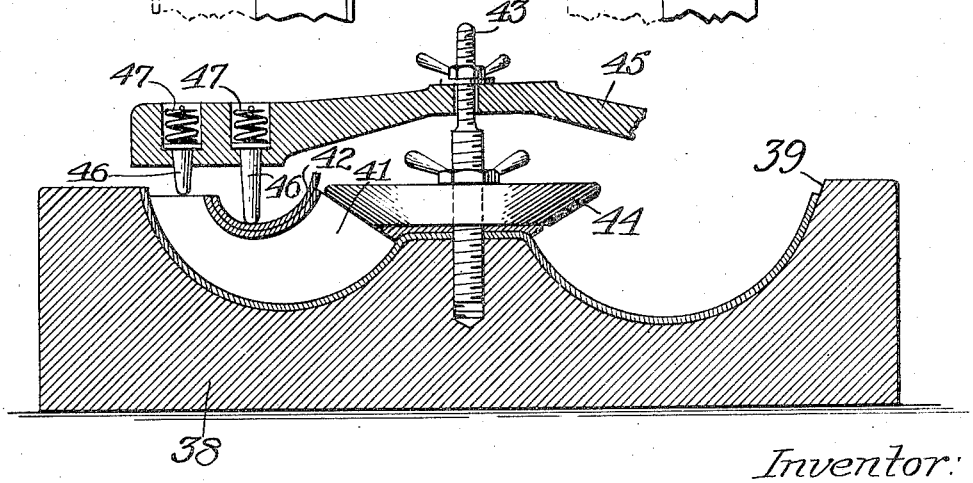
Inventor:
Adiel Y. Dodge,
By Dawson, Ooms & Booth,
Att'ys.

Patented Oct. 30, 1945

2,387,722

UNITED STATES PATENT OFFICE 2,387,722

METHOD OF MAKING VANED ELEMENTS

Adiel Y. Dodge, Rockford, Ill.

Application March 25, 1942, Serial No. 436,087

2 Claims. (Cl. 29—156.8)

This invention relates to a method of making vaned elements and more particularly to the construction of vaned members for hydraulic torque transmitting devices.

It has been the usual practice heretofore in constructing hydraulic torque transmitting devices either to cast the vanes and supporting structures together, or to weld or bolt them together. Such operations are tedious and expensive and are very apt to cause localized stresses resulting in warpage or distortion of the parts, particularly when some or all of the parts are formed of relatively light sheet metal.

It is accordingly one of the objects of the present invention to provide a method of making vaned elements at least in part of sheet metal by which the several parts may be assembled in a rigid unit quickly and easily without danger of warpage or distortion.

Another object of the invention is to provide a method of making hydraulic torque-transmitting devices in which all of the parts forming a single vaned element may be loosely assembled and may simultaneously be secured together by a brazing or soldering operation. Preferably the several preformed parts are loosely assembled with soldering material between them and are yieldingly held in place while the assembly is heated in a non-oxidizing atmosphere to a temperature above the melting point of the solder material.

A further feature of the invention is related to the construction of annular sheet metal parts such as core rings or shrouds. Heretofore such parts have been formed by stamping the annular rings from metal sheets but this method is expensive due to the large dies required and to the waste of material. According to the present invention such parts are formed by a rolling operation from strip material. This operation can be performed by relatively inexpensive machinery and with a minimum of waste.

The above and other objects and advantages of the invention will be more readily apparent from the following description when read in connection with the accompanying drawings in which:

Figure 1 is a diagrammatic view of a hydraulic torque converter of a type which may be constructed according to the invention;

Figure 2 is a partial axial section through a vaned element;

Figure 3 is a partial elevation looking from the left in Figure 2;

Figures 4 and 5 are views similar to Figures 2 and 3 respectively of another type of vaned element;

Figures 6, 7, 8, 9 and 10 are partial sections illustrating steps in the formation of core and shroud members; and Figure 11 is a section through an assembly clamp.

The method relates principally to the formation of vaned elements for hydraulic torque transmitting devices including both fluid fly wheels and torque converters. As an example of the type of device to which the method relates a torque converter has been shown diagrammatically in Figure 1 for connecting a driving shaft 10 to a driven shaft 11. The torque converter includes a series of impeller vanes 12 fixed on an impeller housing connected to the driving shaft 10 and circulating liquid through spaced rotor vanes 13 and 14 which are secured to the driven shaft 11. Between the vanes 13 and 14 a set of stator vanes 15 is arranged supported on a one-way brake 16 which holds the stator vanes against reverse rotation but permits forward rotation thereof. The operation of these devices is well understood in the art and will not be described in detail.

Figures 2 and 3 illustrate one type of vaned element which may be employed to provide the spaced rotor vanes 13 and 14, including an annular core member 17 having spaced circular portions at its inner and outer edges and being offset in its intermediate portion to receive the edge of the stator. The outer series of vanes 13 are formed of sheet metal stampings generally U-shaped in cross section having web portions 18 extending radially from the core and connected by an outer base portion 19. The inner edges of the web portions 18 are formed with curved flanges 21 adapted to overlie and to be secured to the core. A shroud 22 may be secured over the outer edges of the vanes overlying and being fastened to the base portion 19 of the vane stampings as shown.

The inner rotor vanes 14 are similarly formed of sheet metal stampings having webs 23 extending substantially radial to the core and connected by outer base portions 24. Flanges 25 on the inner edges of the webs are adapted to overlie and to be secured to the core 17. The outer edges of the vane stampings are connected to a hub member 26 overlying substantially the entire circumferential extent thereof. If desired, a small shroud 27 may be provided completely to enclose the outer edges of the vane members.

Figures 4 and 5 illustrate a different type of vane which could, if desired, be used as the impeller vanes or which might be used as the rotor vanes of a fluid fly wheel. These vanes, as shown, comprise sheet metal stampings 28 generally U-shaped and having inner flanges 29 adapted to overlie an annular core 31. A hub member 32 is secured to the outer surfaces of the vanes for connecting them to the desired shaft. The hub member, as shown, extends only partially over the vanes so as to leave the outer portion thereof exposed. This provides a semi-skeleton construction in which only half of the outer peripheral portions of the vane is enclosed.

The core and shroud members may be formed according to the method illustrated more particularly in Figures 6 to 10. In this construction a strip of sheet metal 32 is first cut to the proper length and is then rolled into an annulus of U-shaped cross section. The strip is then cut in its central portion in the plane of the annulus along the line 33 of Figure 6 to provide two identical half portions of annular shape. Thereafter the inner edge of the strip is rolled in to the form shown in Figure 7 to provide a substantially semicircular section. This strip is then in proper form to provide a core member such as shown at 31 in Figures 4 and 5.

Figures 8 and 9 illustrate the formation of a core such as 17 of Figures 2 and 3 and in this process a strip 34 cut to the proper length is rolled into an annulus of U-shaped cross section. The annulus is then slit along its central line indicated at 35 to provide two identical halves. These edges are then rolled into the shape shown in Figure 9 to turn in the radial inner edge and to roll a central groove into the strip to receive the ends of the stator vanes.

Figure 10 illustrates the formation of a shroud such as 22 of Figures 2 and 3. According to this method a strip of sheet metal 36 cut to the proper length is rolled into an annulus of U-shaped cross section which is then cut along its central line indicated at 37 in Figure 10. Each edge of this annulus without further treatment may then be used as a shroud.

Figure 11 illustrates one method of assembling the parts according to the invention in a clamp unit including base 38 having an annular groove 39 formed therein of proper shape to receive the vane stampings. Vane stampings of the type shown in any of Figures 2 to 5 may then be inserted in the base as indicated at 41 with their projecting flanges abutting properly to space the stampings in the annular groove. It will be noted that the flanges project in opposite directions from the free ends of the web portions of the stampings so that in the event of some inaccuracies in manufacture the webs may be sprung slightly to fit the stampings into the base. The core member 42 is then laid over the exposed flange portions of the stampings, soldering material, such for example as copper or brass, being placed between the meeting surfaces. If preferred, the soldering material may be placed in the assembly in the form of a strip or powder, or the core and flange portions may be plated or coated in any desired manner.

The several parts are adapted to be held yieldingly in assembled position and for this purpose the base portion 38 carries a double diameter screw member 43 projecting upwardly from the center thereof. A disc 44 is adjustably secured on the screw member and is adapted to abut against the inner ends of the vane stampings as shown to limit their movement in the inward direction. A plate or spider 45 is adjustably secured to the upper end of the screw member and carries a plurality of presser fingers 46 to bear against the outer edges of the vane stampings and against the core. As shown, the fingers 46 are slidable in openings in the plate 45 and are urged downwardly by compression springs 47. With the several parts assembled as shown, the clamp may be placed in a furnace or may otherwise suitably be heated above the melting point of the soldering material so that it will connect the vane stampings and the core member over their entire overlapping area. After heating for the necessary time to effect a tight solder bond the clamp may be removed from the furnace and the assembly may be taken out of the clamp. Because of the fact that the parts are joined over a large area localized stresses are avoided and there is no tendency to produce warping or distortion of the stampings. For this reason relatively light parts may be used throughout to produce a rigid assembly. It will be understood that shroud members and hub portions may simultaneously be secured to the vane stampings at the same time and in the same manner as the core member is connected thereto.

In practicing the present method it is not necessary that the ends of the rolled core member should be joined prior to assembly. In placing the core member on the vane flanges the disconnected ends thereof are caused to overlie one of the flanges as indicated at 48 in Figure 5. During the succeeding soldering or brazing operation opposite end portions of the core are rigidly secured to the same flange thereby connecting the ends of the core rigidly without a separate operation.

While one method embodying the invention has been illustrated and described in detail, it will be understood that many variations could be made therein without departing from the spirit of the invention. Reference will therefore be had to the appended claims to determine the scope of the invention.

This application is a continuation-in-part of my co-pending application, Serial No. 378,843, filed February 14, 1941 now matured into Patent No. 2,336,231.

I claim:

1. The method of forming a vaned element for a hydraulic torque transmitting device comprising forming a plurality of vane members from sheet metal, each of said vane members having a vane portion and a flange portion, forming a strip of sheet metal into an annulus with its ends separated, assembling the vane members and the annular strip with soldering material between the abutting surfaces and with the ends of said strip overlying a flange portion of one of the vane members, and heating the assembly to fuse the parts together.

2. The method of forming a vaned element for a hydraulic torque transmitting device comprising forming from sheet metal a plurality of vane members each having a vane portion and a flange portion, arranging the vane members in annular array, assembling a split annular ring on the vane members with soldering material between the abutting surfaces and with the ends of the ring overlapping a flange portion of one of the vane members, and heating the assembly to fuse the parts together.

ADIEL Y. DODGE.